United States Patent Office 3,218,352
Patented Nov. 16, 1965

3,218,352
HOMOTAURINE PROCESS
Morris Freifelder and Donald J. Cota, Waukegan, Ill., assignors to Abbott Laboratories, North Chicago, Ill., a corporation of Illinois
No Drawing. Filed May 3, 1962, Ser. No. 192,095
4 Claims. (Cl. 260—513)

This invention relates to improvements in the preparation of homotaurine, 3-aminopropane sulfonic acid, and more particularly to its preparation from an ammonium β-sulfopropionitrile.

Various processes for the reduction of organic nitriles to amines have been extensively used heretofore. One of the most vexatious problems encountered in practicing such processes for the production of primary amines has been the formation of undesirable secondary amines which cannot be suitably removed from the desired amine. To suppress secondary amine formation it is common to reduce the nitrile in the presence of excess ammonia or strong acid. Even the use of carefully controlled conditions and an ammonia atmosphere often, as in the preparation of aminoalkylsulfonates, leads to formation of undesired quantities of secondary amines. It has been reported by one of the present inventors, J.A.C.S., 82: 2386, that in a related reaction the absence of ammonia causes 3-indolacetonitrile to be reduced principally to the secondary amine bis-(β-indolylethyl-amine) with only scant quantities of the primary amine tryptamine resulting, while the presence of ammonia in the reduction atmosphere causes a primary amine yield of almost 80%.

Therefore, an important object of this invention is the provision of a process yielding high purity aminopropane sulfonic acid that is essentially free of secondary amine. Another object is the provision of a process that does not lead to the formation of sulfur catalyst poisons. A further object of the invention is to provide a simplified, low pressure method of hydrogenating nitriles to obtain primary amine that is amenable to easy purification. Other objects and advantages will appear in the following specification.

Accordingly, the present process generally involves the hydrogenation of ammonium 2-cyanoethyl sulfonate at above atmospheric pressure in the presence of rhodium catalyst in a hydrogen atmosphere that is substantially free of excess ammonia, i.e. a reaction zone having a pH not exceeding 7.0. Excess ammonia will cause the reaction zone pH to rise above 7.0, while in the absence of ammonia a lower pH will prevail because of the presence of sulfonic acid salt. The preferred process involves reacting ammonium bisulfite and acrylonitrile in an inert solvent, the intermediate ammonium β-sulfopropionitrile is then concentrated and purified and preferably recrystallized from hot alcohol before reduction.

Reduction is preferably performed at low pressure although higher pressures may be used to reduce reaction times. By using a preferred pressure of below about 100 p.s.i. no expensive or elaborate equipment need be employed. The reaction may be performed, for example, in a Parr shaker or any glass-lined laboratory or production equipment. Pressures in excess of 100 p.s.i. decrease reaction time but require more costly equipment and are therefore undesirable. This aspect of the reaction may be carried out at room temperature but elevated temperatures up to the boiling point of the inert solvent may be used. Inert solvent is taken to mean a solvent or diluent that does not react on starting material, does not enter into the reaction, and is easily separated from the final product. Water is a highly suitable inert solvent, but it may be replaced by various suitable organic solvents known to the art.

The reduction aspect of the present process requires much smaller levels of catalyst than has been generally required heretofore. Preferably about 0.5 to 1% rhodium is used in the reduction system. Lower and higher levels may be used but higher percentages have no particular advantage and therefore add cost to the process while lower levels may unduly prolong reaction time. The preferred level is calculated on the basis of weight of rhodium metal to weight of material being reduced. Metallic rhodium in finely divided form may be used as well as other known forms of rhodium catalysts used for hydrogenation. The catalytic material need not be supported but it is preferable to use it on a carrier such as alumina, carbon, silica gel, asbestos, metal oxides, bentonite, kieselguhr, and the like. One of the important advantages of the present process is the absence of the formation of sulforous poisons that inactivate the rhodium catalyst due to the high purity of the intermediate ammonium 2-cyanoethyl sulfonate.

Concentration of the reactants for preparation of the intermediate in the inert solvent is not critical as the products are more water-soluble than the starting materials. Because the process is ordinarily carried out in water or organic solvent and the acrylonitrile is less soluble or less miscible in such solvents than the bisulfite, better results are obtained by providing a high degree of agitation to insure thorough mixing during reaction.

Mixing during hydrogenation may be accomplished by various means known to the art, such as passage of inert gas through the solvent during reaction. Any inert gas, or hydrogen, may be used for this purpose but it is to be remembered that it is neither necessary nor desirable to add excess ammonia gas during reduction to prevent or diminish secondary amine formation.

After reduction the 3-aminopropane sulfonic acid, or homotaurine, is easily separated from the reaction system and purified by methods known to the art.

The following detailed examples will further illustrate the invention but should not be considered as any limitation thereof.

*Example I*

To form ammonium β-sulfopropionitrile, 271 gm. of aqueous ammonium bisulfite is added to a one-liter flask. Over a one-hour period 68 gm. of acrylonitrile at a temperature of 40° to 50° C. is slowly added. Mixing is applied throughout the reaction period. The reaction product is concentrated in vacuo until a heavy slurry of solids is obtained. Acetone is added and the product cooled to 15° C. After filtering, washing and air-drying, the resulting material is recrystallized from one liter of hot methanol to yield 140 gm. of ammonia β-sulfopropionitrile. This represents an overall yield of 70% of product having a melting range of 168° to 178° C., an assay of 99+% and which is negative for $SO_3$ and $SO_4$.

*Example II*

To 50 cc. of water is added 15.2 gm. (0.1 mole) ammonium 2-cyanoethyl sulfonate. To this solution is added 3.0 gm., 5% rhodium on carbon. This mixture is hydrogenated at room temperature under thirty pounds pressure for about two hours or until the uptake of hydrogen is complete. The product is filtered, washed with a small amount of water and evaporated to dryness under reduced pressure. The dry product is washed with absolute alcohol filtered to obtain a yield of 15 gm. of product. The product upon analysis is shown to contain 90.7% primary amine and no secondary amine, amide or nitrile.

*Example III*

β-Sulfopropionitrile is hydrogenated using the process of Example II. The solution after reduction is treated with 200 cc. of acetone and allowed to stand till a solid residue is formed. The solid is treated with pure methanol, filtered and washed to yield 12 gm. of product. Upon analysis it is found to contain 99.5% primary amine and 0.29% moisture. Infrared examination indicates that it is of extremely high purity. This is substantiated by the following analysis: C 26.02, H 6.63, N 10.20. Calculated values: C 25.89, H 6.52, N 10.06.

While in the foregoing specification various embodiments of the invention have been given in considerable detail, no unnecessary limitation should be understood therefrom as it will be appreciated by those skilled in the art that this invention is susceptible to variation without departing from the basic spirit and scope thereof.

We claim:

1. The process for preparing 3-aminopropane sulfonic acid which includes the step of hydrogenating ammonium 2-cyanoethylsulfonate in an inert solvent at super-atmospheric pressure in the presence of a catalytic quantity of rhodium and in an atmosphere substantially free of excess ammonia and essentially containing hydrogen as the active component.

2. In a process for preparing 3-aminopropane sulfonic acid the step of hydrogenating ammonium 2-cyanoethylsulfonate in an inert solvent in a reaction zone maintained at a super-atmospheric pressure of less than about 100 p.s.i. in the presence of a catalytic quantity of rhodium, while pH of the reaction zone is less than about 7.0 and in an atmosphere substantially free of excess ammonia and containing hydrogen.

3. In a process for preparing 3-aminopropane sulfonic acid the step of catalytically hydrogenating ammonium 2-cyanoethylsulfonate in an inert solvent in a reaction zone maintained at super-atmospheric pressure and at a pH of below about 7.0 in the presence of from about 0.25 to about 1% by weight rhodium metal, in an atmosphere substantially free of excess ammonia and essentially consisting of hydrogen.

4. The process of preparing 3-aminopropane sulfonic acid comprising the steps of reacting an aqueous solution of ammonium bisulfite with acrylonitrile to form ammonium 2-cyanoethylsulfonate solution, hydrogenating the sulfonate solution at a temperature below the boiling point of the solution, at a super-atmospheric pressure of less than about 100 p.s.i., in the presence of from about 0.5 to 1% rhodium metal in a hydrogen atmosphere substantially free of excess ammonia.

References Cited by the Examiner
UNITED STATES PATENTS

| | | | |
|---|---|---|---|
| 2,312,878 | 3/1943 | Carpenter | 260—513 |
| 2,462,406 | 2/1949 | Langkammer | 260—513 |

OTHER REFERENCES

Dunworth et al.: J. Am. Chem. Soc., vol. 74, March 1952, pp. 1459–1461.

Freifelder: J. Am. Chem. Soc., vol. 82, May 1960, pp. 2386–2389.

LORRAINE A. WEINBERGER, *Primary Examiner.*

LEON ZITVER, *Examiner.*